United States Patent
Ueno et al.

(10) Patent No.: US 10,889,244 B2
(45) Date of Patent: Jan. 12, 2021

(54) LIGHTING CONTROL DEVICE, LIGHTING DEVICE, AND VEHICLE

(71) Applicant: Panasonic Intellectual Property Management Co., Ltd., Osaka (JP)

(72) Inventors: Masatoshi Ueno, Hiroshima (JP); Masaaki Takamatsu, Nara (JP); Toshiaki Sasaki, Osaka (JP); Kazuya Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 149 days.

(21) Appl. No.: 15/240,305

(22) Filed: Aug. 18, 2016

(65) Prior Publication Data
US 2017/0072837 A1    Mar. 16, 2017

(30) Foreign Application Priority Data

Sep. 11, 2015 (JP) .................. 2015-179032

(51) Int. Cl.
*B60Q 11/00* (2006.01)
*B60Q 1/14* (2006.01)

(52) U.S. Cl.
CPC .......... *B60Q 11/00* (2013.01); *B60Q 1/1415* (2013.01); *B60Q 2300/146* (2013.01)

(58) Field of Classification Search
None
See application file for complete search history.

(56) References Cited

U.S. PATENT DOCUMENTS

| 10,199,843 | B2 * | 2/2019 | Schimel | ................ H02J 7/0013 |
| 2002/0047641 | A1 | 4/2002 | Ito et al. | |
| 2002/0163815 | A1 | 11/2002 | Hayami | |
| 2006/0149427 | A1 | 7/2006 | Evans | |
| 2013/0062936 | A1 * | 3/2013 | Aragai | .................... B60R 16/02 307/9.1 |

(Continued)

FOREIGN PATENT DOCUMENTS

| CN | 102991408 A | 3/2013 |
| JP | H06-164356 | 6/1994 |
| JP | 2002-025788 | 1/2002 |

(Continued)

OTHER PUBLICATIONS

Foreign Office Action issued by the Japanese Patent Office for corresponding Japanese patent application No. 2015-179032 dated Jan. 14, 2020.

*Primary Examiner* — Lynda Jasmin
*Assistant Examiner* — Laura Yesildag
(74) *Attorney, Agent, or Firm* — Renner, Otto, Boisselle & Sklar, LLP

(57) ABSTRACT

The lighting control device includes a controller, a diagnosis circuit, a latch circuit, and a logic circuit. The controller outputs a control signal. The diagnosis circuit outputs an irregular signal. The latch circuit decides a state of a forcibly lighting signal. The logic circuit controls a light source in accordance with an ignition signal, the control signal, and the forcibly lighting signal. The logic circuit turns on the light source in accordance with the ignition signal while receiving the forcibly lighting signal, and turns on the light source in accordance with the control signal while not receiving the forcibly lighting signal.

10 Claims, 9 Drawing Sheets

(56) References Cited

U.S. PATENT DOCUMENTS

| | | | |
|---|---|---|---|
| 2013/0214592 A1* | 8/2013 | Aragai | ............... B60L 1/00 307/9.1 |
| 2015/0001924 A1* | 1/2015 | Kamiya | ............ H01H 47/001 307/9.1 |

FOREIGN PATENT DOCUMENTS

| | | |
|---|---|---|
| JP | 2002-091802 | 3/2002 |
| JP | 2002-326535 A | 11/2002 |

* cited by examiner

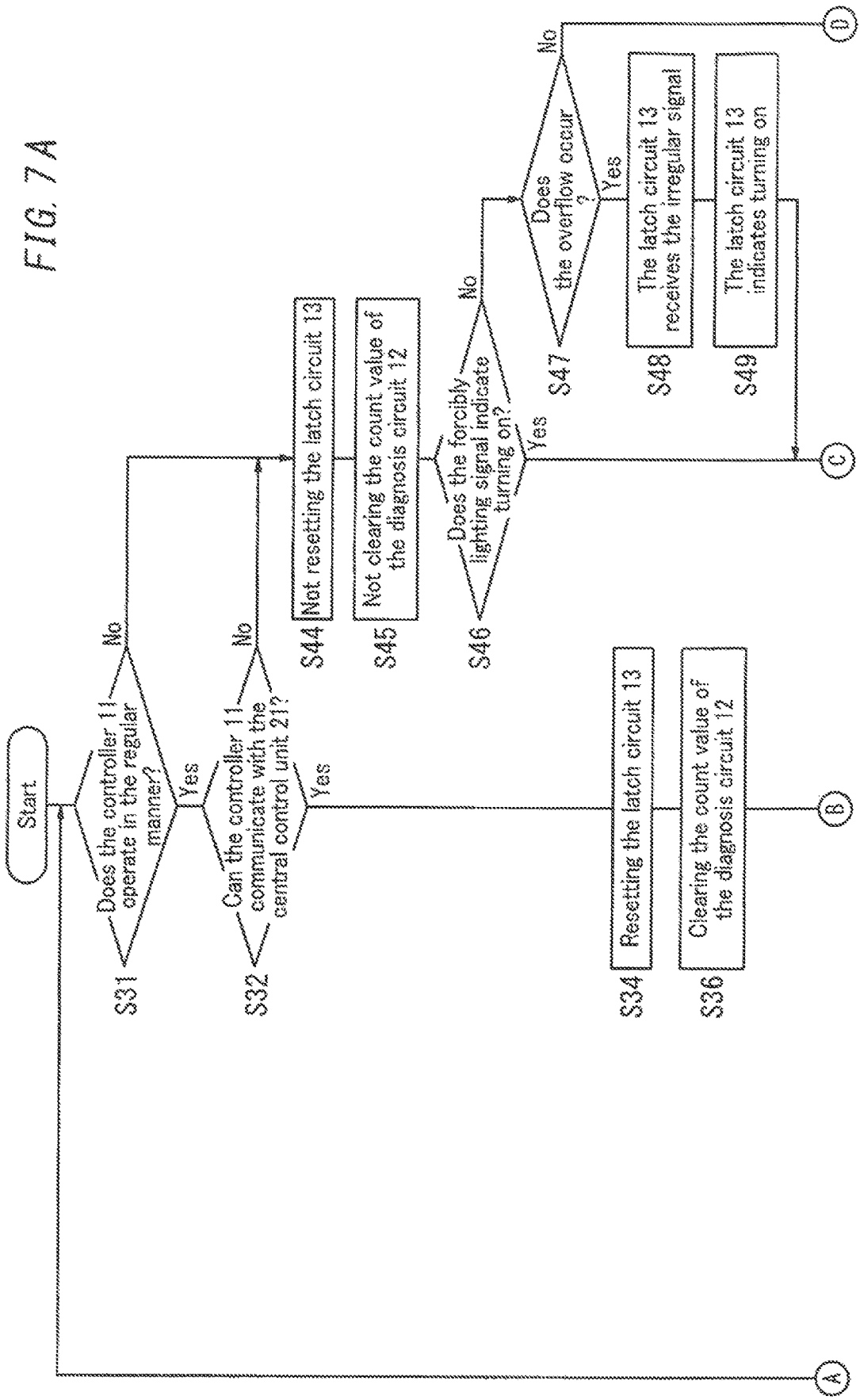

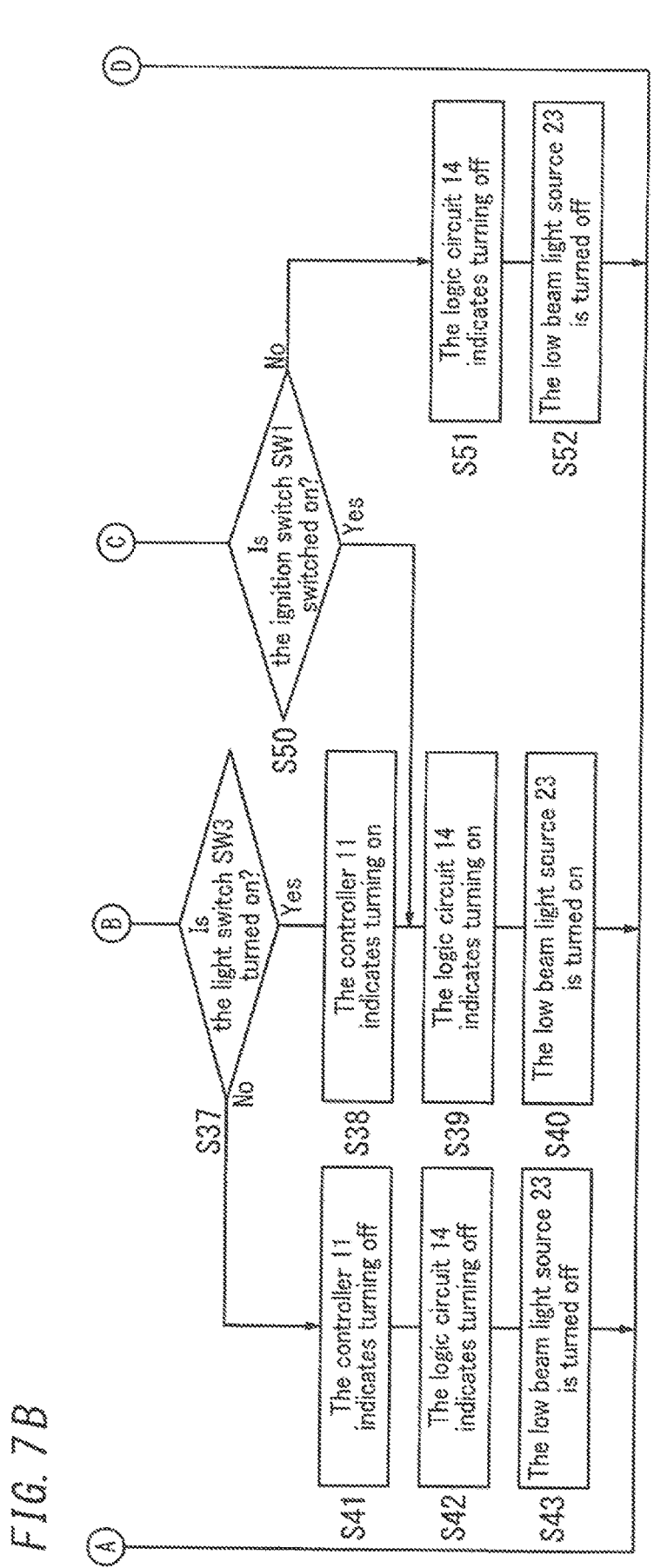

US 10,889,244 B2

LIGHTING CONTROL DEVICE, LIGHTING DEVICE, AND VEHICLE

CROSS-REFERENCE TO RELATED APPLICATION

The present application is based upon and claims the benefit of priority of Japanese Patent Application No. 2015-179032, filed on Sep. 11, 2015, the entire contents of which are incorporated herein by reference.

TECHNICAL FIELD

The present disclosure generally relates to lighting control devices, lighting devices and vehicles, and more specifically to a lighting control device, a lighting device, and a vehicle to control a light source.

BACKGROUND ART

Document 1 (JP 2002-326535 A) discloses a conventional example of a lighting device for vehicles. The vehicle, such as an automobile, includes multiple lighting appliances to light a space ahead of the vehicle when running at night or in the dark. The lighting appliances are installed on left and right sides of the front of the vehicle. The lighting appliances include an actuator and a lamp controlled by the actuator to turn on.

The actuator includes a sub-central processing unit (CPU). The sub-CPU executes processes according to predetermined algorithms based on instructions and others from an electronic controller installed in the vehicle.

In such a conventional vehicle, the sub-CPU functions as a controller and is connected to light sources, such as side marker lights for indicating the width of the vehicle, and direction indicator lights, in addition to the aforementioned lighting appliances. However, in such a conventional vehicle, there may be a possibility that the sub-CPU, such as a microcontroller, may turn off the light sources unpredictably. In a conventional lighting device for vehicles, multiple controllers are used to realize fail safe operation for handling the above event.

However, equipping the lighting device for vehicles with such multiple controllers may require a complicating configuration of the lighting device for vehicles as well as complicating programs executed by the respective multiple controllers.

SUMMARY

In view of the above circumstance, an objective of the present disclosure would be to provide a lighting control device, a lighting device, and a vehicle capable of realizing fail safe operation yet having a simplified configuration.

A lighting control device of an aspect in accordance with the present disclosure includes a controller, a diagnosis circuit, a latch circuit, and a logic circuit. The controller is configured to output a control signal based on an indicating signal indicating whether to turn on or off a light source of a vehicle. The diagnosis circuit is configured to output an irregular signal when detecting irregular operation of the controller. The latch circuit is configured to set a forcibly lighting signal in a first state until receiving the irregular signal, and set the forcibly lighting signal in a second state when receiving the irregular signal. The logic circuit is configured to receive an ignition signal indicating whether a motor of the vehicle is in an activated state or a rest state, the control signal, and the forcibly lighting signal. The logic circuit is configured to control the light source in accordance with the control signal while the forcibly lighting signal is in the first state, and control the light source in accordance with the ignition signal while the forcibly lighting signal is in the second state.

A lighting device of another aspect in accordance with the present disclosure includes the lighting control device of the above aspect and the light source.

A vehicle of another aspect in accordance with the present disclosure includes the lighting device of the above aspect and a vehicle body in which the lighting device is installed.

BRIEF DESCRIPTION OF THE DRAWINGS

The figures depict one or more implementation in accordance with the present teaching, by way of example only, not by way of limitations. In the figures, like reference numerals refer to the same or similar elements.

FIGS. 7A to 7B are flowcharts of an operation of the lighting control device and the lighting device of the above.

DETAILED DESCRIPTION

Figure 1:
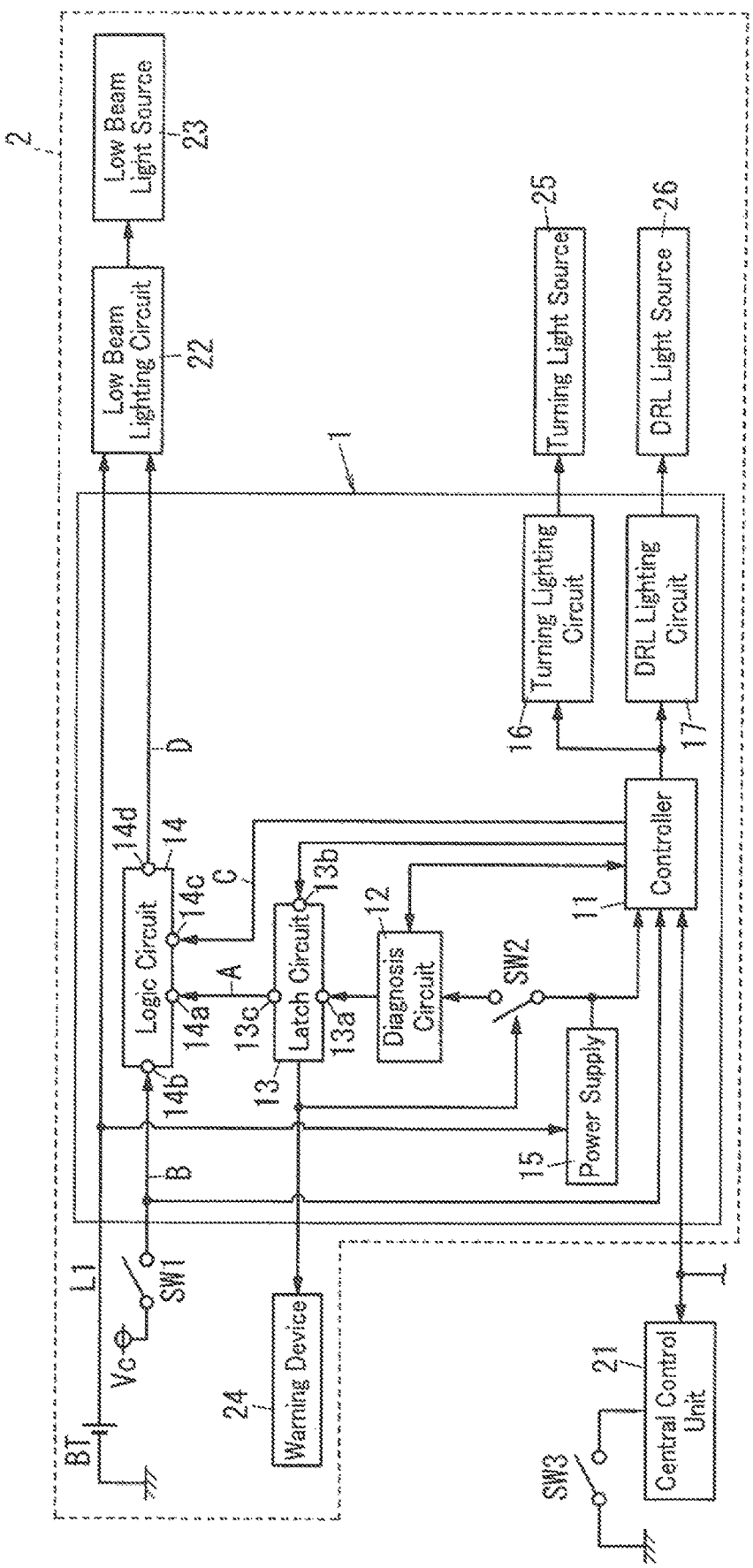
FIG. 1 is an exemplary block diagram of a lighting device including a lighting control device of Embodiment 1 according to the present disclosure.

Hereinafter, lighting control devices, lighting devices and vehicles of embodiments according to the present disclosure are described in detail with reference to the drawings. In the following embodiments, the vehicles are described as automobiles, and both the lighting control devices and the lighting devices are used to control headlights of the automobiles. Note that, the following embodiments are some of embodiments of the present disclosure and can be modified without departing from the technical concept of the present disclosure.

Embodiment 1

First of all, configurations of a lighting control device 1 and a lighting device 2 of the present embodiment are described with reference to FIG. 1.

The lighting control device 1 includes a controller 11, a diagnostic circuit 12, a latch circuit 13, and a logic circuit 14.

The lighting device 2 includes the lighting control device 1, an ignition switch SW1, a lighting circuit (low beam lighting circuit) 22, a light source (low beam light source) 23, and a warning device 24.

The ignition switch SW1 is switched on when a motor, such as an internal combustion engine, of a vehicle 3 (refer to FIG. 4) is activated. The ignition switch SW1 has a first end electrically connected to a DC power supply Vc. The ignition switch SW1 has a second end electrically connected to the logic circuit 14. When the motor of the vehicle 3 is in an activated state, the ignition switch SW1 is on (closed) and the logic circuit 14 thus receives an ignition signal (DC voltage) B. In contrast, when the motor of the vehicle 3 comes into a rest state, the ignition switch SW1 is switched off (opened). In other words, the ignition signal B indicates whether the motor of the vehicle 3 is in the activated state or the rest state. The ignition switch SW1 is on and the ignition signal B is in a first state (indicating that the ignition signal B has a high level, in the present embodiment) when the motor of the vehicle 3 is in the activated state. On the other hand, the ignition switch SW1 is off and the ignition signal B is in a second state (indicating that the ignition signal B has a low level, in the present embodiment) when the motor of the vehicle 3 is in the rest state, The controller 11 may include a microcontroller, for example. The controller 11 executes processes, described below, by running appropriately programs stored in a memory, in response to an input signal. The controller 11 establishes bidirectional communication with a central control unit (e.g., an electronic control unit [ECU]) 21 of the vehicle 3 over wired or wireless communication.

The controller 11 determines whether a present state is a state in which the controller 11 can communicate with the central control unit 21, or another state in which the controller 11 is communication with the central control unit 21. Hereinafter, both the state in which the controller 11 can communicate with the central control unit 21 and the other state in which the controller 11 is in communication with the central control unit 21 are collectively referred to as a communicable state.

The controller 11 receives an indicating signal indicating turning on or off of the low beam light source 23 from the central control unit 21 when the present state is the communicable state. And, the controller 11 outputs a control signal C for turning on or off the low beam light source 23, to the logic circuit 14, based on the indicating signal. The controller 11 sets the control signal C in a first state (indicating that the control signal C has a high level, in the present embodiment) when the indicating signal indicates turning on the low beam light source 23. In other words, the controller 11 outputs the high level control signal C to the logic circuit 14. In contrast, the controller 11 sets the control signal C in a second state (indicating that the control signal C has a low level, in the present embodiment) when the indicating signal indicates turning off the low beam light source 23. In other words, the controller 11 outputs the low level control signal C to the logic circuit 14.

The central control unit 21 is installed in the vehicle 3. The central control unit 21 may include a microcontroller, for example. The central control unit 21 outputs indicating signals to devices such as lighting devices and power window devices which are installed in the vehicle 3, based on instructions given by users (drivers) for example. For example, when a user switches on the light switch SW3 of the vehicle 3, the central control unit 21 outputs the indicating signal for turning on the low beam light source 23, to the controller 11.

The diagnosis circuit 12 may include a watch dog timer, for example. The diagnosis circuit 12 monitors whether the controller 11 operates in a regular manner. The diagnosis circuit 12 increments a count value until certain time elapses. After a lapse of the certain time, overflow of the count value occurs and thus the diagnosis circuit 12 outputs an irregular signal to the latch circuit 13. That is, the diagnosis circuit 12 by virtue of its output voltage outputs the irregular signal to the latch circuit 13 when the count value reaches a value (an upper limit) which is corresponding to the certain time. Note that, the phrase "the diagnosis circuit 12 outputs the irregular signal" is intended to "the diagnosis circuit 12 sets the output voltage to the high level".

The condition where the controller 11 operates in the regular manner refers to the condition where the controller 11 operates to turn on and off the light source 23 in accordance with operation of the control signal C and the ignition signal B. The condition where the controller 11 operates in the irregular manner refers to the condition where the controller 11 is not be able to operate to turn on and off the light source 23 in accordance with the operation of the control signal C and the ignition signal B as intended. Irregular operation of the controller 11 may occur as a result of any of a variety of reasons including, but not limited to, component failure, broken electrical connection, processing glitch, and the like. According to the present embodiment described herein, the diagnosis circuit 12 incorporates a watch dog timer reset by the controller 11 in order to detect irregular operation of the controller 11. The assumption is that if the controller 11 operates in the irregular manner, the controller 11 cannot send the reset signal to the diagnosis circuit 12. Thus, the overflow of the count value of the watch dog timer will occur.

It will be appreciated that while a watch dog timer detecting the irregular operation of the controller 11 is employed in the exemplary embodiment, the diagnosis circuit 12 may, in an alternate embodiment, detect irregular operation of the controller 11 using any of other known techniques of detecting irregular operation of the controller 11 without departing the scope of the disclosure.

The controller 11 resets the count value of the diagnosis circuit 12, for example periodically, before the overflow of the count value occurs. In other words, the controller 11 periodically clears the count value of the diagnosis circuit 12 so that the count value does not reach the upper limit. Accordingly, a state where the count value is reset by the controller 11 before the overflow of the count value occurs considered as a state where the controller 11 operates in the regular manner. On the other hand, a state where the overflow of the count value occurs is considered as a state where the controller 11 operates in an irregular (unexpected) manner. Note that, it is considered that the irregular operation of the controller 11 may include turning off a light source which is required to be on, and stopping its operation. The diagnosis circuit 12 sets the output voltage to a low level when the overflow of the count value does not occur. Besides, when the overflow of the count value of the diagnosis circuit 12 occurs, the diagnosis circuit 12 outputs the irregular signal as a pulse signal by setting the output voltage to a high level for predetermined time preferably. In other words, the diagnosis circuit 12 sets the output voltage to the high level for the predetermined time, and sets the output voltage to the low level again after the predetermined time passes. Note that, a state where the output voltage has the low level can be considered as a state where the irregular signal is not outputted from the diagnosis circuit 12.

The latch circuit 13 may include an RS flip-flop including, for example two input terminals (a set input terminal 13a and a reset input terminal 13b) and one output terminal 13c. The output terminal 13c is electrically connected to the logic circuit 14. The latch circuit 13 determines whether to keep a state unchanged of an output (a forcibly lighting signal A) or switch the state of the output, based on respective signals (high level and/or low level signals) inputted into the set input terminal 13a and the reset input terminal 13b of the latch circuit 13. The set input terminal 13a of the latch circuit 13 is electrically connected to the diagnosis circuit 12. So that, the set input terminal 13a of the latch circuit 13 receives the irregular signal (the pulse signal) when the overflow of the count value of the diagnosis circuit 12 occurs. The latch circuit 13 sets the forcibly lighting signal A in a second state (indicating that the forcibly lighting signal A has a high level, in the present embodiment) when receiving the irregular signal. The latch circuit 13 sets the forcibly lighting signal A in a first state (indicating that the forcibly lighting signal A has a low level, in the present embodiment) until receiving the irregular signal. Besides, the latch circuit 13 sets the forcibly lighting signal A in the first state when the reset input terminal 13b receives a reset signal. The reset input terminal 13b is electrically connected to the controller 11. The controller 11 inputs the reset signal (the high level signal) to the reset input terminal 13b when the controller 11 intends to reset the latch circuit 13.

Note that, hereinafter, the phrase "the forcibly lighting signal A is outputted" is used as an alternative to "the forcibly lighting signal A is in the second state", if necessary. In addition, the phrase "the forcibly lighting signal A is not outputted" is used as an alternative to "the forcibly lighting signal A is in the first state", if necessary.

Next, an operation of the latch circuit 13 is described with reference to Table 1. Table 1 shows "S" indicating a state of the set input terminal 13a, "R" indicating a state of the reset input terminal 13b, and "Q" indicating a state of the output terminal 13c. Besides, "1" indicates a high level voltage and "0" indicates a low level voltage.

The state that the output terminal 13c does not output the forcibly lighting signal A (S=0, R=0, Q is kept to the low level) is described below. For example, as shown in Table 1, the latch circuit 13 receives the reset signal (the high level signal) by the reset input terminal 13b from the controller 11. However, the latch circuit 13 does not receive the irregular signal by the set input terminal 13a from the diagnosis circuit 12. In this case, the latch circuit 13 does not output the forcibly lighting signal A from the output terminal 13c (S=0, R=1, Q=0). After this, the latch circuit 13 still keeps the state unchanged of not outputting the forcibly lighting signal A (the forcibly lighting signal A is in the first state) even if the reset signal is set to the low level (S=0, R=0, Q is kept in the state unchanged). Accordingly, the latch circuit 13 does not output the forcibly lighting signal A from the output terminal 13c unless receiving the irregular signal (the high level signal) from the diagnosis circuit 12. In other words, the latch circuit 13 does not output the forcibly lighting signal A from the output terminal 13c to the logic circuit 14, as long as the controller 11 operates in the regular manner.

The set input terminal 13a receives the irregular signal (the high level signal) when the controller 11 turns to a state of operating in the irregular manner from the state of operating in the regular manner. At this time, the latch circuit 13 outputs the forcibly lighting signal A from the output terminal 13c (S=1, R=0, Q=1). Even though the irregular signal is the pulse signal and the output voltage of the diagnosis circuit 12 is switched from the high level to the low level (i.e., the irregular signal is no longer outputted), the latch circuit 13 still keeps the state unchanged of outputting the forcibly lighting signal A (the forcibly lighting signal A is in the second state) until the reset input terminal 13b receives the reset signal (the high level signal) (S=0, R=0, Q is kept in the state unchanged). Additionally, when the controller 11 operates in the regular manner again, the controller 11 inputs the reset signal (the high level signal) to the reset input terminal 13b to thereby reset the latch circuit 13. At this time, the forcibly lighting signal A is switched to the first state from the second state. Accordingly, the latch circuit 13 does not output the forcibly lighting signal A (S=0, R=1, Q=0). And, the latch circuit 13 still keeps the state (the forcibly lighting signal A is in the first state) unchanged of not outputting the forcibly lighting signal A even though the controller 11 stops outputting the reset signal, that is the reset signal is in the low level (S=0, R=0, Q is kept in the state unchanged).

The logic circuit 14 is configured to turn on and off the low beam light source 23 based on conditions. As shown in Table 2, the conditions of turning on and off of the low beam light source 23 are described as the combination of the forcibly lighting signal A, the ignition signal B and the control signal C. Whether to turn on the low beam light source 23 is decided according to the output signal D reflecting an operation result.

Note that, Table 2 shows "1" indicating a high level voltage, and "0" indicating a low level voltage. Besides, the logic circuit 14 indicates tuning on the low beam light source 23 when the output signal D has the high level (voltage corresponds to "1"). Furthermore, the logic circuit 14 indicates tuning off the low beam light source 23 when the output signal D has a voltage corresponding to the low level. Additionally, "turning on" and "turning off" shown in the row corresponding to "low beam lighting" indicate instructions of turning on and off of the low beam lighting circuit 22, respectively.

TABLE 1

| S | R | Q |
|---|---|---|
| 0 | 0 | Keeping state unchanged |
| 0 | 1 | 0 |
| 1 | 0 | 1 |
| 1 | 1 | 0 |

TABLE 2

| Signal | Condition 1 | Condition 2 | Condition 3 | Condition 4 | Condition 5 | Condition 6 | Condition 7 | Condition 8 |
|---|---|---|---|---|---|---|---|---|
| Forcibly lighting signal A | 1 | 1 | 0 | 1 | 1 | 0 | 0 | 0 |
| Ignition signal B | 1 | 1 | 1 | 0 | 0 | 0 | 1 | 0 |
| Control signal C | 1 | 0 | 0 | 1 | 0 | 0 | 1 | 1 |

TABLE 2-continued

| Signal | Condition 1 | Condition 2 | Condition 3 | Condition 4 | Condition 5 | Condition 6 | Condition 7 | Condition 8 |
|---|---|---|---|---|---|---|---|---|
| Output signal D | 1 | 1 | 0 | 0 | 0 | 0 | 1 | 1 |
| Low beam light source | on | on | off | off | off | off | on | on |

Hereinafter, if necessary the phrase "the ignition signal B is inputted" is used as an alternative to "the ignition signal B is in the first state". When "the ignition signal B is inputted", "the ignition switch SW1 is on". Besides, if necessary the phrase "the ignition signal B is not inputted" is used as an alternative to "the ignition signal B is in the second state". When "the ignition signal B is not inputted", "the ignition switch SW1 is off".

The output signal D has the high level in a case where the forcibly lighting signal A has the high level (the forcibly lighting signal A is in the second state) and the ignition signal B is inputted (conditions 1 and 2). In this case, the controller 11 operates in the irregular manner and the ignition switch SW1 is on. In a case where the forcibly lighting signal A has the low level (the forcibly lighting signal A is in the first state) and the control signal C has the high level (the control signal C is in the first state), the output signal D has the high level, too. In other words, the logic circuit 14 outputs the instruction of turning on, to the low beam lighting circuit 22, when the controller 11 operates in the regular manner and the logic circuit 14 receives the high level control signal C indicating the turning on of the low beam light source 23 (conditions 7 and 8).

The output signal D has the low level under any of the conditions 3 to 6. When the forcibly lighting signal A is in the first state and the control signal C has the low level (the control signal C is in the second state), the output signal D has the low level. In other words, the logic circuit 14 outputs the instruction of turning off, to the low beam lighting circuit 22, when the controller 11 inputs the low level control signal C indicating turning off to the logic circuit 14 under a situation where the controller 11 operates in the regular manner (conditions 3 and 6). On the other hand, when the forcibly lighting signal A has the low level (the forcibly lighting signal A is in the second state) and the ignition signal B has the low level (the ignition signal B is in the second state), the output signal D has the low level. In other words, when the controller 11 operates in the irregular manner, the logic circuit 14 outputs the instruction of turning off to the low beam lighting circuit 22 unless receiving the ignition signal B (conditions 4 and 5).

Figure 2:
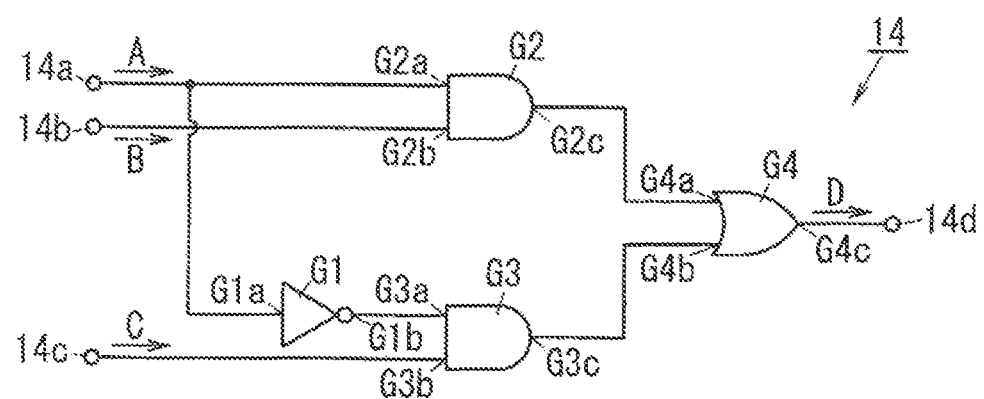
FIG. 2 is a circuit diagram of an exemplary logic circuit of the lighting control device of the above.

As shown in FIG. 2, to give the operation results in Table 2, the logic circuit 14 includes an inverter (NOT gate) G1, two AND gates G2 and G3, and an OR gate G4. The logic circuit 14 includes a first input terminal 14a, a second input terminal 14b, a third input terminal 14c, and an output terminal 14d. The first input terminal 14a is electrically connected to the output of the latch circuit 13, and thus receives the forcibly lighting signal A. The second input terminal 14b is electrically connected to the second end of the ignition switch SW1, and thus receives the ignition signal B in accordance with the state of the ignitions switch SW1. The third input terminal 14c is electrically connected to the controller 11 and thus receives the control signal C having the high level or the low level. The output terminal 14d is electrically connected to the low beam lighting circuit 22 and outputs the instruction of turning on or off of the low beam lighting circuit 22.

The inverter G1 has an input port G1a and an output port G1b. The AND gate G2 has two input ports G2a and G2b, and an output port G2c. The AND gate G3 has two input ports G3a and G3b, and an output port G3c. The OR gate G4 has two input ports G4a and G4b, and an output port G4c.

The input port G2a of the AND gate G2 is electrically connected to the first input terminal 14a. The input port G2b of the AND gate G2 is electrically connected to the second input terminal 14b. The input port G1a of the inverter G1 is electrically connected to the first input terminal 14a. The input port G3a of the AND gate G3 is electrically connected to the output port G1b of the inverter G1. The input port G3b of the AND gate G3 is electrically connected to the third input terminal 14c. The input G4a of the OR gate G4 is electrically connected to the output port G2c of the AND gate G2. The input port G4b of the OR gate G4 is electrically connected to the output port G3c of the AND gate G3. The output port G4c of the OR gate G4 is electrically connected to the output terminal 14d.

The AND gate G2 receives the forcibly lighting signal A and the ignition signal B. Then, the AND gate G2 outputs an operation result (a conjunction) of the forcibly lighting signal A and the ignition signal B. The inverter G1 receives the forcibly lighting signal A, and outputs an inverted forcibly lighting signal. The AND gate G3 receives the output from the inverter G1 and the control signal C. Then, the AND gate G3 outputs an operation result (a conjunction) of the output from the inverter G1 and the control signal C. The OR gate G4 receives the operation result of the AND gate G2 and the operation result of the AND gate G3. Then, the OR gate G4 outputs an operation result (a disjunction). The high level output signal D outputted from the OR gate G4 corresponds to the instruction of turning on, and the low level output signal D outputted from the OR gate G4 corresponds to the instruction of turning off.

As for the logic circuit 14, the AND gate G2 receives the forcibly lighting signal A and the AND gate G3 receives the inverted forcibly lighting signal. Accordingly, the state of the output signal D of the logic circuit 14 determined in accordance with the output signal of the AND gate G2 (i.e., the ignition signal B) when the forcibly lighting signal A has the high level. Therefore, when the controller 11 operates in the irregular manner, the low beam light source 23 is turned on or off in accordance with the ignition switch SW1. On the other hand, the output signal D of the logic circuit 14 is determined in accordance with the output signal of the AND gate G3 (i.e., the control signal C) when the forcibly lighting signal A has the low level. Therefore, when the controller 11 operates in the regular manner, the low beam light source 23 is turned on or off in accordance with the control signal C.

The low beam light source 23 is for example a halogen lamp or an LED and installed at the front of the vehicle 3 as a headlight. The low beam light source 23 is installed so as to have a slightly downward optical axis (refer to FIG. 5).

As shown in FIG. 1, the low beam lighting circuit 22 switches between turning on and off of the low beam light source 23 in accordance with the signal (the output signal D) outputted from the logic circuit 14. For example, the low beam lighting circuit 22 turns on the low beam light source 23 when receiving the instruction of turning on (the high level output signal D) from the logic circuit 14. Also, the low beam lighting circuit 22 turns off the low beam light source 23 when receiving the instruction of turning off (the low level output signal D) from the logic circuit 14. The low beam lighting circuit 22 may include a converter circuit. The low beam lighting circuit 22 is supplied electrical power from a battery BT via a power supplying line L1, and converts it into suitable electrical power for the low beam light source 23.

Figure 4:
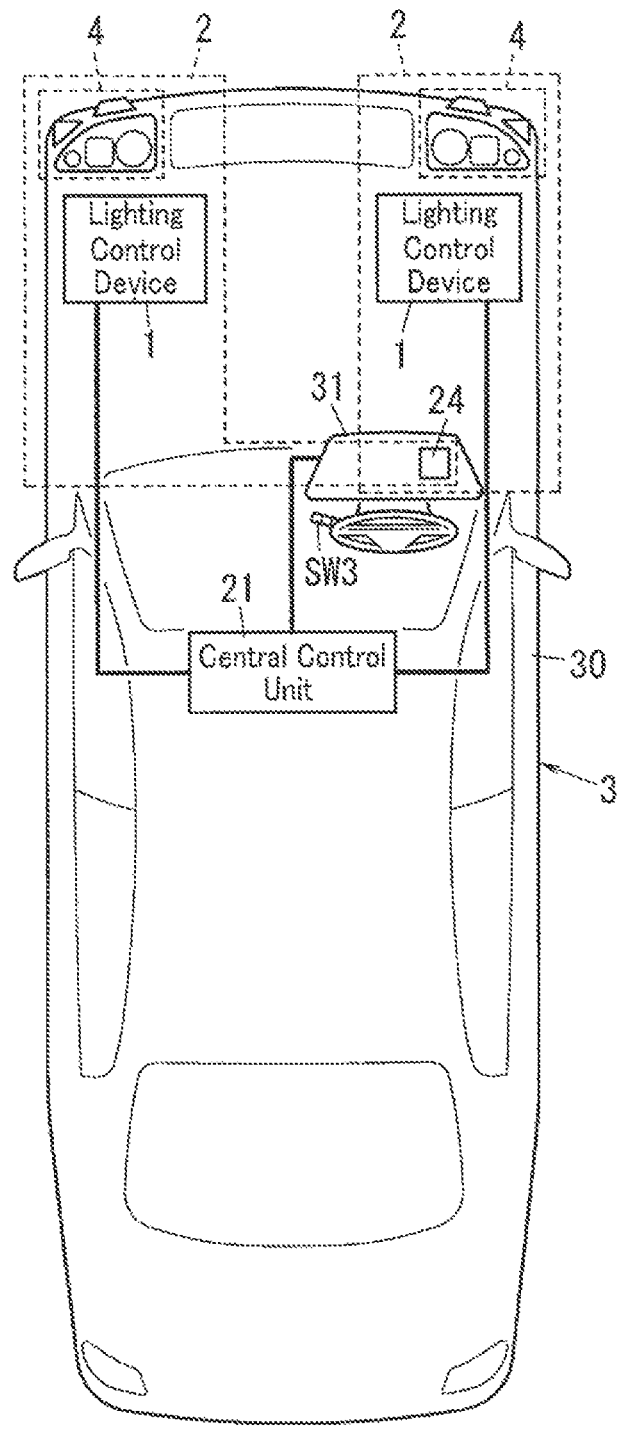
FIG. 4 is a configuration diagram of a vehicle of Embodiment 1 according to the present disclosure.

The warning device 24 is situated in, for example an instrument panel 31 installed in front of a driver's seat of the vehicle 3 (refer to FIG. 4). The latch circuit 13 outputs an informing signal to the warning device 24 when the latch circuit 13 receives the irregular signal. The warning device 24 alerts a user such as a driver by activating an indicator of the instrument panel 31, for example. Note that, the latch circuit 13 may output the forcibly lighting signal A as the informing signal. In this case, for example the warning device 24 informs only while the informing signal has the high level. For example, the warning device 24 may have at least one of a buzzer or a speaker so as to inform aurally and a light source or a display so as to inform visually.

Note that, there may be a probability that the latch circuit 13 erroneously outputs the forcibly lighting signal A even though the controller 11 operates in the regular manner. In this case, the controller 11 stops outputting the forcibly lighting signal A by resetting the latch circuit 13. Note that, the controller 11 is electrically connected to a signal line conveying the ignition signal B and monitors whether the logic circuit 14 receives the ignition signal B by the ignition switch SW1 turning on or off.

Timings that the controller 11 outputs the reset signal to the latch circuit 13 are described as follows. The controller 11 resets the latch circuit 13 at any one of reset timings T1 to T4 described below when the controller 11 can communicate with the central control unit 21. The reset timing T1 is timing when the control signal C outputted from the controller 11 is switched from the instruction of the turning on (the high level) to the instruction of the turning off (the low level). In other words, the reset timing T1 is timing when the controller 11 sets the control signal C in the second state. The reset timing T2 is timing when the control signal C outputted from the controller 11 is switched from the instruction of turning off to the instruction of turning on. In other words, the reset timing T2 is timing when the controller 11 sets the control signal C in the first state. The reset timing T3 is timing when the ignition switch SW1 is switched from an on state to an off state. In other words, the reset timing T3 is timing when the ignition signal B is switched to the second state. The reset timing T4 is timing when the ignition switch SW1 is switched from the off state to the on state. In other words, the reset timing T4 is timing when the ignition signal B is switched to the first state.

Note that, the controller 11 does not output the reset signal to the latch circuit 13 when the controller 11 cannot communicate with the central control unit 21. Besides, the controller 11 does not clear the count value of the diagnosis circuit 12 when the controller 11 cannot communicate with the central control unit 21.

Note that, the lighting control device 1 of the present embodiment further includes a power supply 15 and a switch SW2. However, the power supply 15 and the switch SW2 are not necessary.

The power supply 15 is supplied electrical power from the battery BT, and supplies suitable electrical power to the diagnosis circuit 12 via the controller 11 and the switch SW2.

The switch SW2 is electrically connected between the power supply 15 and the diagnosis circuit 12. The switch SW2 may be used to stop the diagnosis circuit 12 by cutting the electrical power supplied to the diagnosis circuit 12 when the latch circuit 13 receives the irregular signal and outputs the informing signal (the high level signal) to the warning device 24. Accordingly, it is possible to reduce power consumption required for the lighting control device 1 by stopping the operation of the diagnosis circuit 12 when the diagnosis circuit 12 outputs the irregular signal. Note that, when the controller 11 operates in the regular manner again and thus the latch circuit 13 receives the reset signal, the informing signal is set to the low level and then the switch SW2 is turned on to supply electrical power to the diagnosis circuit 12.

The lighting device 2 of the present embodiment may include a turning light source 25 to be turned on in order to inform that the vehicle 3 is going to turn left or right, and a DRL (Daytime Running Lamp) light source 26 (refer to FIG. 5) to be kept on anytime. Furthermore, the lighting control device 1 preferably includes a turning lighting circuit 16 configured to turn on and off the turning light source 25 and a DRL lighting circuit 17 configured to turn on and off the DRL light source 26. The turning lighting circuit 16 and the DRL lighting circuit 17 turn on or off the turning light source 25 and the DRL light source 26 in accordance with signals sent from the controller 11, respectively.

Figure 5:
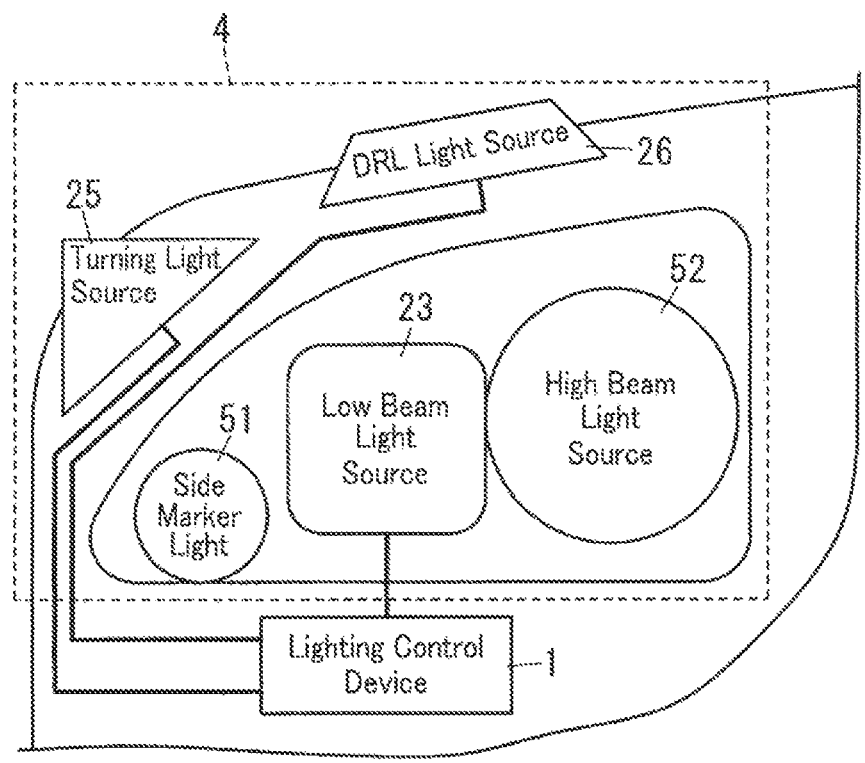
FIG. 5 is an enlarged view of a primary part of the vehicle.

Additionally, the lighting device 2 of the present embodiment may include a side marker light 51 and a high beam light source 52 (refer to FIG. 5). The controller 11 preferably receives the indicating signals of indicating turning on or off of multiple light sources from the central control unit 21 and then outputs signals of indicating the turning on or off to multiple lighting circuits, individually.

Figure 3A:
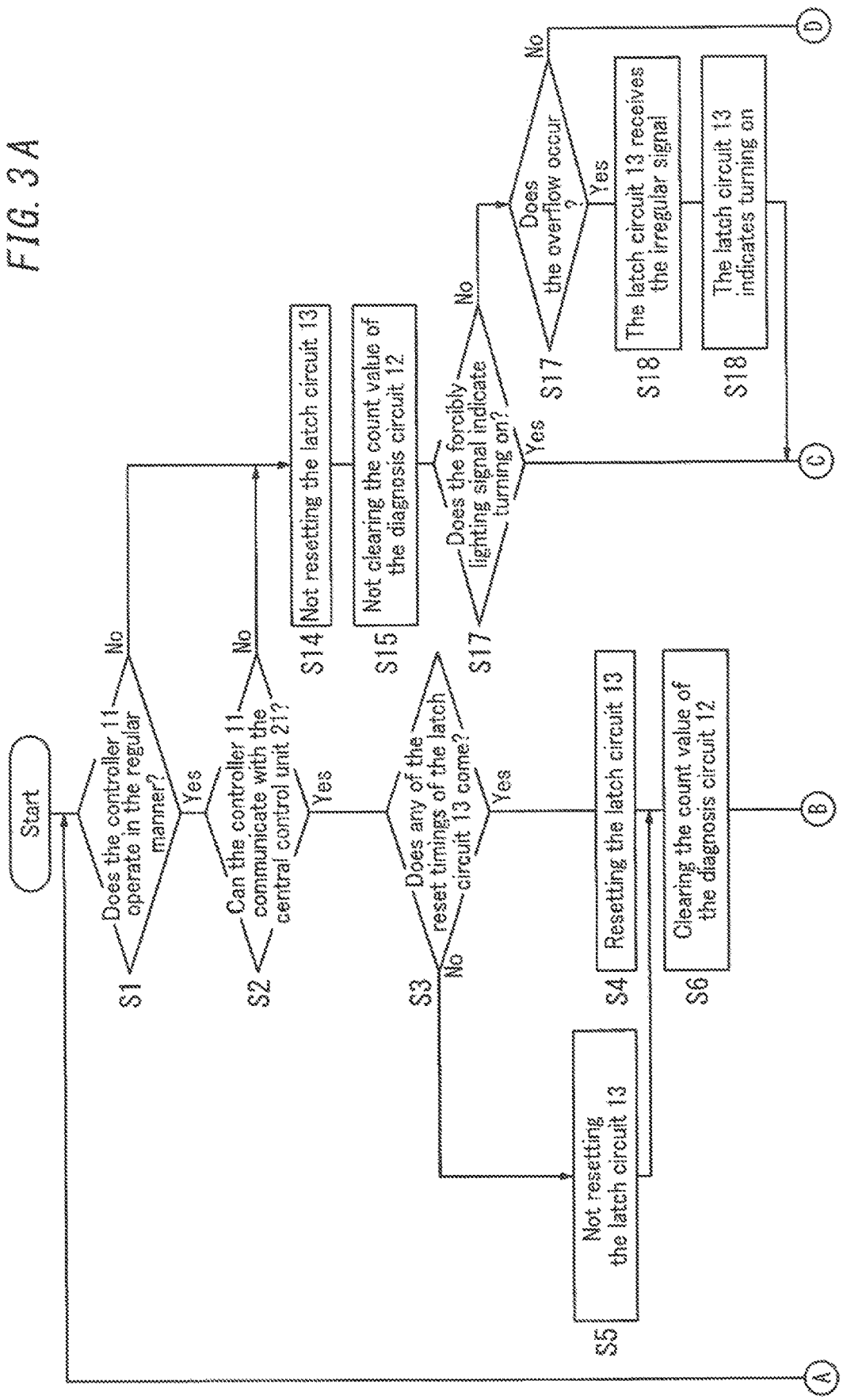
FIGS. 3A to 3B are flowcharts of an operation of the lighting control device and the lighting device of the above.
Figure 3B:
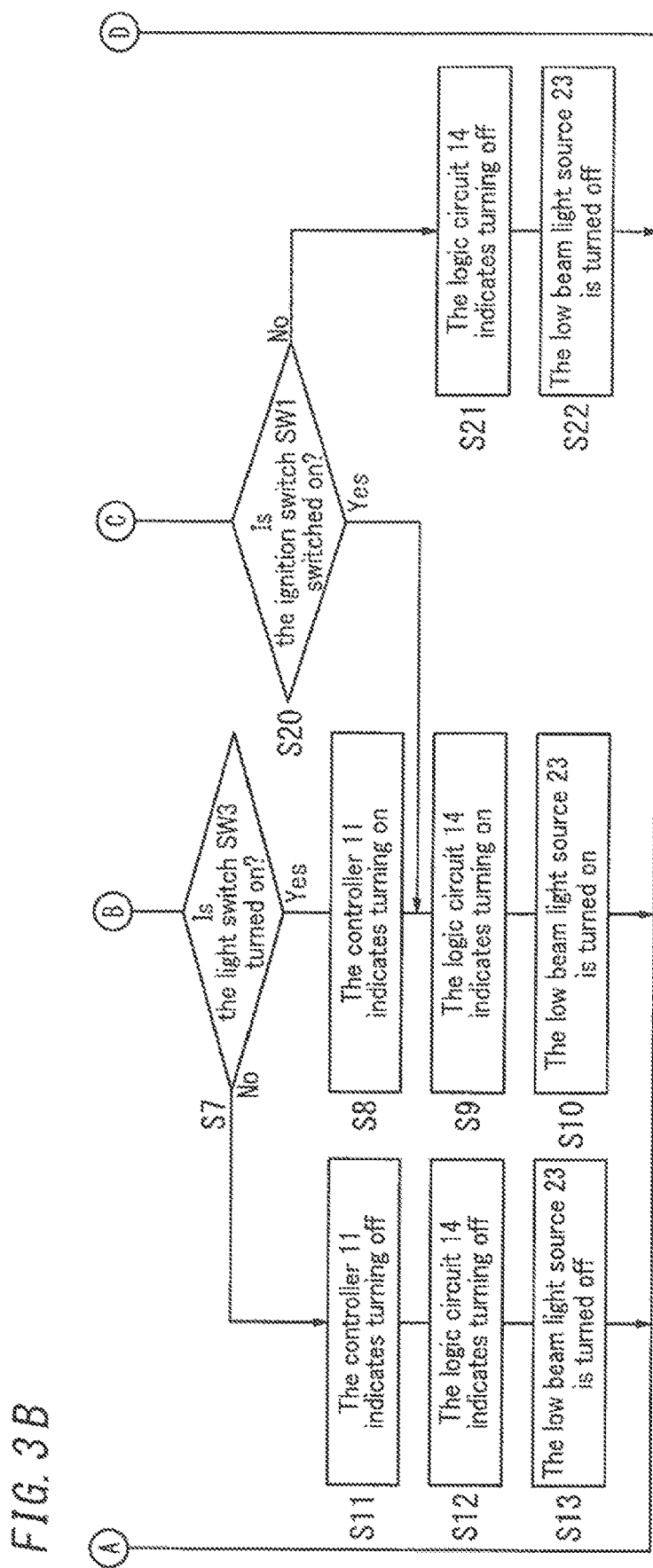

Then, the operation of the lighting control device 1 is described with reference to flowcharts shown in FIG. 3A and FIG. 3B.

In the beginning, when the controller 11 operates in the regular manner (S1; Yes), the controller 11 determines whether the controller 11 can communicate with the central control unit 21 (S2). When the controller 11 can communicate with the central control unit 21 (S2; Yes), the controller 11 determines whether any of the reset timings T1 to T4 comes (S3). When the controller 11 determines that any of the reset timings T1 to T4 comes (S3; Yes), the controller 11 resets the latch circuit 13 (S4). On the other hand, when the controller 11 determines that none of the reset timings T1 to T4 comes (S3; No), the controller 11 does not reset the latch circuit 13 (S5). Irrespective of whether the controller 11 resets the latch circuit 13, the controller 11 clears the count value of the diagnosis circuit 12 before the overflow of the count value occurs (S6). The diagnosis circuit 12 starts counting again (S6). The controller 11 determines whether to receive the indicating signal of indicating turning on of the low beam light source 23 which is outputted from the central control unit 21 when the light switch SW3 is turned on by a user (S7). When the controller 11 receives the indicating signal of indicating turning on of the low beam light source 23 which is outputted from the central control unit 21 (S7; Yes), the controller 11 outputs the high level control signal C indicating turning on of the low beam light source 23 to the logic circuit 14 (S8). In this case, the forcibly lighting signal A has the low level (the forcibly lighting signal A is in the first state), the ignition signal B has the high level (the ignition signal B is in the first state) or the low level (the ignition signal B the second state), and the control signal C has the high level (the control signal C is in the first state). Therefore, the logic circuit 14 outputs the output signal D indicating turning on of the low beam light source 23 to the low beam lighting circuit 22 (S9). Thus, the low beam light source 23 is turned on (S10). The process of the lighting control device 1 returns to the step S1.

On the other hand, in the step S7, when the controller 11 receives the indicating signal of indicating turning off of the low beam light source 23 from the central control unit 21 (S7; No), the controller 11 outputs the low level control signal C indicating turning off of the low beam light source 23 to the logic circuit 14 (S11). In this case, the forcibly lighting signal A has the low level (the forcibly lighting signal A is in the first state), the ignition signal B has the high level (the ignition signal B is in the first state) or the low level (the ignition signal B is in the second state), and the control signal C has the low level (the control signal C is in the second state). Therefore, the logic circuit 14 outputs the output signal D indicating turning off of the low beam light source 23 to the low beam lighting circuit 22 (S12). Thus, the low beam light source 23 is turned off (S13). The process of the lighting control device 1 returns to the step S1.

In the step S1, when the controller 11 operates in the irregular manner (S1; No), the controller 11 can neither reset the latch circuit 13 in the regular manner (S14) nor clear the count value of the diagnosis circuit 12 in the regular manner (S15). Also, in the step S2, when the controller 11 cannot communicate with (i.e., is not connected to) the central control unit 21 (S2; No), the controller 11 neither resets the latch circuit 13 (S14) nor clears the count value of the diagnosis circuit 12 (S15). In either case, the latch circuit 13 outputs the forcibly lighting signal A (S16; Yes), and the process of the lighting control device 1 goes to the step S20. In contrast, when the latch circuit 13 does not output the forcibly lighting signal A (S16; No), the diagnosis circuit 12 determines whether the overflow of the count value occurs (S17). When the overflow of the count value of the diagnosis circuit 12 does not occur (S17; No), the process of the lighting control device 1 returns to the step S1.

In the step S17, when the overflow of the count value of the diagnosis circuit 12 occurs (S17; Yes), the diagnosis circuit 12 outputs the irregular signal to the latch circuit 13 (S18). The latch circuit 13 outputs the forcibly lighting signal A to the logic circuit 14 when receiving the irregular signal (S19). When the ignition signal B is inputted into the logic circuit 14 (the ignition switch SW1 is turned on) (S20; Yes), the forcibly lighting signal A has the high level (the forcibly lighting signal A is in the second state), the ignition signal B has the high level (ignition signal B is in the first state), and the control signal C has the high level (the control signal C is in the first state) or the low level (the control signal C is in the second state). Therefore, the logic circuit 14 outputs the output signal D indicating turning on of the low beam light source 23 to the low beam lighting circuit 22 (S9). Thus, the low beam light source 23 is turned on (S10). In contrast, when the ignition signal B is not inputted into the logic circuit 14 (the ignition switch SW1 is turned off) (S20; No), the forcibly lighting signal A has the high level (the forcibly lighting signal A is in the second state), the ignition signal B has the low level (the ignition signal B is in the second state), and the control signal C has the high level (the control signal C is in the first state) or the low level (the control signal C is in the second state). Therefore, the logic circuit 14 outputs the output signal D indicating turning off of the low beam light source 23 to the low beam lighting circuit 22 (S21). Thus, the low beam light source 23 is turned off (S22). After this, the process of the lighting control device 1 returns to the step S1.

Even if the controller 11 once operates in the irregular manner, the controller 11 determines whether the controller 11 can communicate with the central control unit 21 (S2) provided that the controller 11 recovers to operate in the regular manner (S1; Yes). When the controller 11 can communicate with the central control unit 21 (S2; Yes), the controller 11 resets the latch circuit 13 at any of the reset timings T1 to T4 (S4). Accordingly, the forcibly lighting signal A is switched to the low level, and the low beam light source 23 is turned on or off depending on the state of the light switch SW3 (S10, S13).

Furthermore, even if the controller 11 once determines that it cannot communicate with the central control unit 21, the controller 11 again determines whether the controller 11 can communicate with the central control unit 21 (S2) as long as the controller 11 operates in the regular manner (S1; Yes). When the controller 11 can communicate with the central control unit 21 again (S2; Yes), the controller 11 resets the latch circuit 13 at the any of the reset timings T1 to T4 (S4). Accordingly, the forcibly lighting signal A is switched to the low level, and the low beam light source 23 is turned on or off depending on the state of the light switch SW3 (S10, S13).

The lighting control device 1 and the lighting device 2 of the present embodiment are configured as described above and thus can turn on the low beam light source 23 even though the controller 11 operates in the irregular manner. Therefore, the lighting control device 1 and the lighting device 2 of the present embodiment can reduce the irregular operations and ensure high safety due to realizing fail safe operation. Besides, the lighting control device 1 is constituted by circuits including the diagnosis circuit 12, the latch circuit 13, the logic circuit 14, and it is thus possible to simplify the configuration of the lighting control device 1.

Note that, the latch circuit 13 of the present embodiment is only an example, and is not limited to the RS flip-flop. Further, the configuration of the gate circuits of the logic circuit 14 is only an example, and is not limited to that of the present embodiment. Although the lighting device 2 of the present embodiment is configured to turn on and off the low beam light source 23 by the output (the output signal D) outputted from the logic circuit 14, the lighting device 2 may be configured to turn on and off light sources other than the low beam light source 23. The lighting device 2 of the present embodiment may be configured to turn on and off any light sources including the low beam light source 23 by the output (the output signal D) outputted from the logic circuit 14.

The lighting control device 1 of the present embodiment is provided in the vehicle 3. The lighting control device 1 includes the controller 11, the diagnosis circuit 12, the latch circuit 13, and the logic circuit 14. The controller 11 is configured to output the control signal C in accordance with the indicating signal indicating the turning on and off of the light source (low beam light source) 23. The diagnosis circuit 12 is configured to monitor whether the controller 11 operates in the regular manner, and output the irregular signal when detecting the controller 11 operating in the irregular manner. The latch circuit 13 is configured to keep the state of the forcibly lighting signal A unchanged when receiving the irregular signal. The logic circuit 14 is configured to control turning on and off of the light source 23 in accordance with the ignition signal B indicating that the motor of the vehicle 3 is in the activated state, the control signal C, and the forcibly lighting signal A. The logic circuit 14 turns on and off the light source 23 in accordance with the state of the ignition signal B when receiving the forcibly lighting signal A. The logic circuit 14 turns on and off the light source 23 in accordance with the state of the control signal C when not receiving the forcibly lighting signal A.

The lighting control device 1 of the present embodiment is configured as described above and thus can realize fail safe operation yet having the simplified configuration.

In the lighting control device 1 of the present embodiment, preferably, when the controller 11 determines that the controller 11 can communicate with the sender (the central control unit) 21 outputting the indicating signal and when the light source 23 is switched from an on state to off state in accordance with the control signal C, the controller 11 resets the latch circuit 13 to stop outputting the forcibly lighting signal A. Preferably, when the controller 11 determines that the controller 11 can communicate with the sender (the central control unit) 21 outputting the indicating signal and when the light source 23 is switched from off state to on state, the controller 11 resets the latch circuit 13 to stop outputting the forcibly lighting signal A.

It is preferable that the lighting control device 1 of the present embodiment be included in the vehicle 3 and the logic circuit 14 receive the ignition signal B indicating the motor of the vehicle 3 is in the activated state. Preferably, when the controller 11 determines that the controller 11 can communicate with the sender (the central control unit) 21 outputting the indicating signal and when the state of the logic circuit 14 is switched from the state where the logic circuit 14 receives the ignition signal B to the state where the logic circuit 14 does not receive the ignition signal B, the controller 11 resets the latch circuit 13 to stop outputting the forcibly lighting signal A. Preferably, when the controller 11 determines that the controller 11 can communicate with the sender (the central control unit) 21 outputting the indicating signal and when the state of the logic circuit 14 is switched from the state where the logic circuit 14 does not receive the ignition signal B to the state where the logic circuit 14 receives the ignition signal B, the controller 11 resets the latch circuit 13 to stop outputting the forcibly lighting signal A.

When the lighting control device 1 of the present embodiment is configured as described above, the controller 11 resets the latch circuit 13 even when external factors cause the latch circuit 13 to output the forcibly lighting signal A while the controller 11 operates in the regular manner. Therefore, the lighting control device 1 of the present embodiment can reduce the irregular operations caused by the latch circuit 13.

The lighting device 2 of the present embodiment includes the lighting control device 1 and the light source 23 controlled by the lighting control device 1.

The lighting device 2 of the present embodiment is configured as described above, and the lighting device 2 thus can realize fail safe operation yet having the simplified configuration by including the lighting control device 1.

The lighting device 2 of the present embodiment preferably further includes the warning device 24. The latch circuit 13 is configured to output the informing signal to the warning device 24 when receiving the irregular signal. The warning device 24 preferably reports irregular operations when receiving the informing signal.

When the lighting device 2 of the present embodiment is configured as described above, the user (the driver) can easily notice the irregular operations of the controller 11. Therefore, the lighting device 2 can ensure higher safety more.

Hereinafter, the vehicle (the automobile) 3 of the present embodiment is described with references to FIG. 4 and FIG. 5.

As shown in FIG. 4, the vehicle 3 of the present embodiment includes a plurality of lighting devices 2 (two lighting devices 2 in the illustrated example), a vehicle body 30 in which the plurality of lighting devices 2 are installed, the central control unit 21, the light switch SW3, and an instrument panel 31.

The warning device 24 is configured to, when receiving the informing signal, turn on an indicator provided in the instrument panel 31 placed in front of the driver's seat in the vehicle body 30.

The light switch SW3 is placed near the driver's seat and to be turned on and off by the user.

Each of the plurality of lighting devices 2 preferably includes a lighting system 4.

As shown in FIG. 5, the lighting systems 4 are provided to the right and left sides of the front part of the vehicle body 30, respectively. Each of the lighting systems 4 includes a low beam light source 23, a turning light source 25, a daytime running light (DRL) light source 26, a side marker light 51 and a high beam light source 52. Each of the side marker light 51 and the high beam light source 52 is turned on and off in accordance with a corresponding signal inputted from the controller 11.

The vehicle 3 of the present embodiment includes the lighting device 2 and the vehicle body 30 in which the lighting device 2 is installed.

The vehicle 3 of the present embodiment is configured as described above and thus can realize fail safe operation yet having the simplified configuration by including the lighting device 2 even when the controller 11 operates in the irregular manner.

The vehicle 3 of the present embodiment includes the lighting device 2 and the vehicle body 30 in which the lighting device 2 is installed. The warning device 24 is installed in the vehicle body 30.

When the vehicle 3 of the present embodiment is configured as described above, the user (the driver) can easily notice the irregular operations of the controller 11. Therefore, the vehicle 3 can ensure higher safety more.

In the vehicle 3 of the present embodiment, the light source 23 is preferably the headlight installed at the front of the vehicle body 30.

When the vehicle 3 of the present embodiment is configured as described above, the vehicle 3 can run more safely, because a space in front of the vehicle 3 is still illuminated even though the controller 11 operates in the irregular manner.

In the vehicle 3 of the present embodiment, the light source 23 is preferably used as the light source for the low beam.

When the vehicle 3 of the present embodiment in configured as described above, the vehicle 3 can run more safely even when the controller 11 operates in the irregular manner.

Embodiment 2

Figure 6:
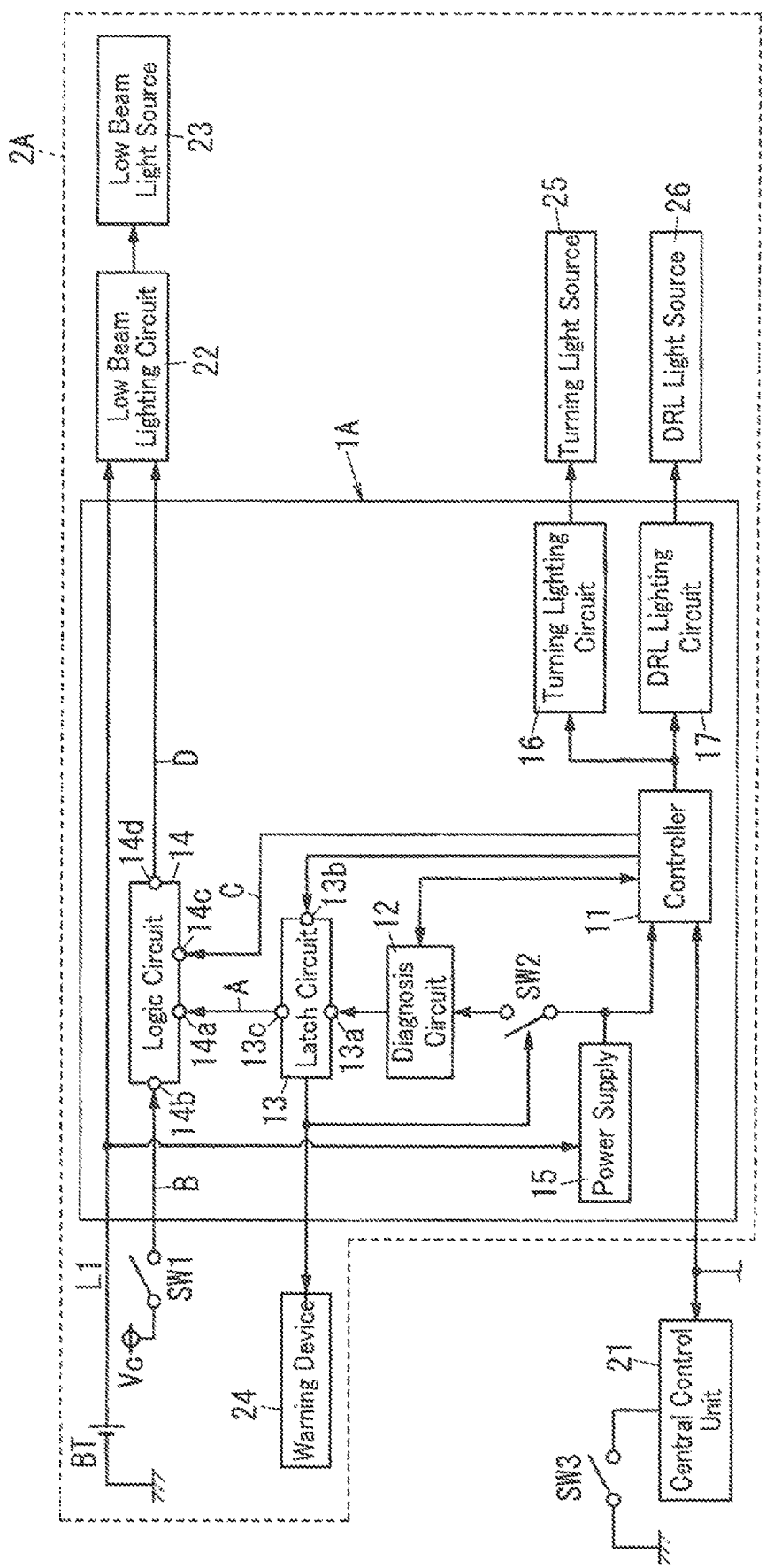
FIG. 6 is a block diagram of a lighting control device and a lighting device of Embodiment 2 according to the present disclosure.

The lighting control device 1A and the lighting device 2A of the present embodiment are described with references to FIG. 6, FIG. 7A, and FIG. 7B. The lighting control device 1A and the lighting device 2A of the present embodiment differ from the lighting control device 1 and the lighting device 2 of Embodiment 1 in that the latch circuit 13 is periodically reset irrespective of the reset timings T1 to T4 by the controller 11. Components of the present embodiment which are the same as those of Embodiment 1 are designated by common reference signs to avoid redundant explanations.

The controller 11 of the present embodiment periodically resets the latch circuit 13. In other words, the controller 11 periodically outputs a reset signal to the latch circuit 13. When the controller 11 can communicate with the central control unit 21, the controller 11 resets the latch circuit 13 in accordance with an operation illustrated in the flowcharts shown in FIG. 7A and FIG. 7B. Note that, unlike Embodiment 1, the lighting control device 1A is not provided with a connection line for connecting the power supplying line of the ignition signal B and the controller 11 (refer to FIG. 6).

The operation of the lighting control device 1A of the present embodiment is described with reference to flowcharts shown in FIG. 7A and FIG. 7B. The steps S31, S32, S34, and S36 to S52 indicate the same operation or state as the steps S1, S2, S4, and S6 to S22 as shown in FIG. 3A and FIG. 3B, respectively. Therefore, detailed explanations thereof are omitted, hereinafter.

When the controller 11 operates in the regular manner and can communicate with the central control unit 21 (S31; Yes, S32; Yes), the controller 11 resets the latch circuit 13 (S34). The controller 11 outputs the reset signal to the latch circuit 13 so that the latch circuit 13 does not output the forcibly lighting signal A.

Note that, the reset signal is a pulse signal. The controller 11 sets the output voltage to the high level for the predetermined time, and sets the output voltage to the low level again after the predetermined time passes.

The controller 11 outputs the control signal C indicating turning on or off of the logic circuit 14 (S38, S41), to turn on or off the low beam light source 23 in accordance with the control signal C (S39, S40, S42, S43). Accordingly, when the forcibly lighting signal A has the low level (the forcibly lighting signal A in the first state), the ignition signal B has the high level (the ignition signal B is in the first state) or the low level (the ignition signal B is in the second state), and the control signal C has the high level (the control signal C is in the first state), the low beam light source 23 is turned on. When the forcibly lighting signal A has the low level (the forcibly lighting signal A is in the first state), the ignition signal B has the high level (the ignition signal B is in the first state) or the low level (the ignition signal B is in the second state), and the control signal C has the low level (the control signal C is in the second state), the low beam light source 23 is turned off.

As long as the controller 11 operates in the regular manner and can communicate with the central control unit 21 (S31; Yes, S32; Yes), the lighting control device 1A periodically repeats the process described above in accordance with the flowcharts shown in FIG. 7A and FIG. 7B. Therefore, the controller 11 periodically resets the latch circuit 13.

Even when the controller 11 once operates in the irregular manner, the controller 11 determines whether the controller 11 can communicate with the central control unit 21 (S32) provided that the controller 11 recovers to operate in the regular manner (S31; Yes). When the controller 11 determines that it can communicate with the central control unit 21 (S32; Yes), the controller 11 resets the latch circuit 13 (S34). Accordingly, the forcibly lighting signal A is switched to the low level, and the low beam light source 23 is turned on or off depending on the state of the light switches SW3 (S40, S43).

Furthermore, even when the controller 11 once cannot communicate with the central control unit 21, the controller 11 determines whether the controller 11 can communicate with the central control unit 21 again (S32) provided that the controller 11 recovers to operate in the regular manner (S31; Yes). When the controller 11 determines that it can communicate with the central control unit 21 again (S32; Yes), the controller 11 resets the latch circuit 13 (S34). Accordingly, the forcibly lighting signal A is switched to the low level, and the low beam light source 23 is turned on or off depending on the state of the light switch SW3 (S40, S43).

Note that, in the lighting control device 1A of the present embodiment, the controller 11 may additionally reset the latch circuit 13 at any of the reset timings T1 to T4 described in Embodiment 1.

In the lighting control device 1A of the present embodiment, the controller 11 monitors the output of the latch circuit 13. And, preferably, when the controller 11 determines that it can communicate with the sender (the central control unit) 21 outputting the indicating signal, the controller 11 resets the latch circuit 13 to stop outputting the forcibly lighting signal A.

When the lighting control device 1A of the present embodiment is configured as described above, the controller 11 resets the latch circuit 13 even when external factors cause the latch circuit 13 to output the forcibly lighting signal A while controller 11 operates in the regular manner. Therefore, the lighting control device 1A can reduce the irregular operations caused by the latch circuit 13.

As apparent from aforementioned Embodiment 1 and Embodiment 2, the lighting control device (1; 1A) of the first aspect in accordance with the present disclosure includes a controller (11), a diagnosis circuit (12), a latch circuit (13), and a logic circuit (14). The controller (11) is configured to output a control signal (C) based on an indicating signal indicating whether to turn on or off a light source (23) of a vehicle (3). The diagnosis circuit (12) is configured to output an irregular signal when detecting irregular operation of the controller (11). The latch circuit (13) is configured to set a forcibly lighting signal (A) in a first state until receiving the irregular signal, and set the forcibly lighting signal (A) in a second state when receiving the irregular signal. The logic circuit (14) is configured to receive an ignition signal (B) indicating whether a motor of the vehicle (3) is in an activated state or a rest state, the control signal (C), and the forcibly lighting signal (A). The logic circuit (14) is configured to control the light source (23) in accordance with the control signal (C) while the forcibly lighting signal (A) is in the first state, and control the light source (23) in accordance with the ignition signal (B) while the forcibly lighting signal (A) is in the second state.

Accordingly, the above light control device (1; 1A) can realize fail safe operation yet having the simplified configuration.

In the lighting control device (1; 1A) of the second aspect in accordance with the present disclosure which can be realized in combination with the first aspect, the controller (11) is configured to set the control signal (C) in a first state when the indicating signal indicates turning on the light source (23). The controller (11) is configured to set the control signal (C) in a second state when the indicating signal indicates turning off the light source (23). The ignition signal (B) is in a first state while the motor of the vehicle (3) is in the activated state. The ignition signal (B) is in a second state while the motor of the vehicle (3) is in the rest state. The logic circuit (14) is configured to turn on the light source (23) while the forcibly lighting signal (A) is in the first state and the control signal (C) is in the first state. The logic circuit (14) is configured to turn off the light source (23) while the forcibly lighting signal (A) is in the first state and the control signal (C) is in the second state. The logic circuit (14) is configured to turn on the light source (23) while the forcibly lighting signal (A) is in the second state and the ignition signal (B) is in the first state. The logic circuit (14) is configured to turn off the light source (23) while the forcibly lighting signal (A) is in the second state and the ignition signal (B) is in the second state.

According to the second aspect, the light source (23) is controlled to be turned on and off according to individual conditions defined by the states of the forcibly lighting signal (A), the control signal (C), and the ignition signal (B), the logic circuit (14) can be simplified.

In the lighting control device (1; 1A) of the third aspect in accordance with the present disclosure which can be realized in combination with the second aspect, the latch circuit (13) is configured to set the forcibly lighting signal (A) in the first state when receiving a reset signal. The controller (11) is configured to output the reset signal to the latch circuit (13) at a timing (T1; T2) of setting the control signal (C) in either the first state or the second state when determining that the controller (11) can communicate with a sender (21) outputting the indicating signal.

According to the third aspect, the lighting control device (1; 1A) can reduce the irregular operations caused by the latch circuit (13) because the latch circuit (13) is reset at the above timing (T1; T2).

In the lighting control device (1; 1A) in accordance with the fourth aspect in accordance with the present disclosure which can be realized in combination with the second or third aspect, the latch circuit (13) is configured to set the forcibly lighting signal (A) in the first state when receiving a reset signal. The controller (11) is configured to output the reset signal to the latch circuit (13) at a timing (T3; T4) of setting the ignition signal (B) in either the first state or the second state when determining that the controller (11) can communicate with a sender (21) outputting the indicating signal.

According to the fourth aspect, the lighting control device (1; 1A) can reduce the irregular operations caused by the latch circuit (13) because the latch circuit (13) is reset at the above timing (T3; T4).

In the lighting control device (1; 1A) of the fifth aspect in accordance with the present disclosure which can be realized in combination with any one of the first to fourth aspects, the latch circuit (13) is configured to set the forcibly lighting signal (A) in the first state when receiving a reset signal. The controller (11) is configured to start a process of periodically outputting the reset signal to the latch circuit (13) when determining that the controller (11) can communicate with a sender (21) outputting the indicating signal.

According to the fifth aspect, the lighting control device (1; 1A) can reduce the irregular operations caused by the latch circuit (13) because the latch circuit (13) is periodically reset.

A lighting device (2; 2A) of the sixth aspect in accordance with the present disclosure includes the lighting control device (1; 1A) according to any one of the first to fifth aspects and the light source (23).

The lighting device (2; 2A) is configured as described above to include the lighting control device (1; 1A), and thus can realize fail safe operation yet having the simplified configuration.

The lighting device (2; 2A) of the seventh aspect in accordance with the present disclosure which can be realized in combination with the sixth aspect includes a warning device (24). The latch circuit (13) is configured to output an informing signal to the warning device (24) when receiving the irregular signal. The warning device (24) is configured to provide notice when receiving the informing signal.

According to the seventh aspect, a user (the driver) can easily notice the irregular operations of the controller (11). Therefore, higher safety can be more ensured.

A vehicle (3) of the eighth aspect in accordance with the present disclosure includes the lighting device (2; 2A) according to the sixth aspect, and a vehicle body (30) in which the lighting device (2; 2A) is installed.

The vehicle (3) is configured as described above, and it thus can realize fail safe operation yet having the simplified configuration in case the controller (11) operates in the irregular manner.

In the vehicle (3) of the ninth aspect in accordance with the present disclosure which can be realized in combination with the eighth aspect, the lighting device (2; 2A) further includes a warning device (24). The latch circuit (13) is configured to output an informing signal to the warning device (24) when receiving the irregular signal. The warning device (24) is configured to provide notice when receiving the informing signal.

In the vehicle (3) of the tenth aspect in accordance with the present disclosure which can be realized in combination with the ninth aspect, the warning device (24) is installed inside of the vehicle body (30).

According to the tenth aspect, the user (driver) can easily notice the irregular operations of the controller (11) during driving and it is thus possible to ensure safety more.

In the vehicle (3) of the eleventh aspect in accordance with the present disclosure which can be realized in combination with any one of the eighth to tenth aspects, the light source (23) includes a headlight installed at a front part of the vehicle body (30).

According to the eleventh aspect, the vehicle (3) can run more safely, because a space in front of the vehicle (3) is illuminated even though the controller (11) operates in the irregular manner during driving or the like.

In the vehicle (3) of the twelfth aspect in accordance with the present disclosure which can be realized in combination with the eleventh aspect, the light source (23) includes a light source for low beams.

According to the twelfth aspect, the vehicle (3) can run more safely even though the controller (11) operates in the irregular manner during driving.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting control device comprising:
   a controller configured to output a control signal based on an indicating signal indicating whether to turn on or off a light source of a vehicle;
   a diagnosis circuit configured to output a first signal when detecting irregular operation of the controller;
   a latch circuit configured to set a second signal in a first state until receiving the first signal, and set the second signal in a second state when receiving the first signal; and a logic circuit configured to receive an ignition signal, the control signal, and the second signal,
wherein the ignition signal indicates whether a motor of the vehicle is in an activated state or a rest state,
wherein the control signal, indicates a first control state or a second control state,
wherein the logic circuit is configured to control the light source in accordance with the control signal or the ignition signal depending on the second signal being in the first or the second state,
the logic circuit configured to
control the light source in accordance with the control signal while the second signal is in the first state, and
control the light source in accordance with the ignition signal while the second signal is in the second state,
the lighting control device further comprising a switch configured to be electrically connected between a power supply and the diagnosis circuit, the power supply being configured to supply electrical power to the controller and the diagnosis circuit,
the latch circuit being configured to turn on and off the switch by an informing signal from the latch circuit to a warning device,
the latch circuit being configured to turn off the switch when receiving the first signal, and turn on the switch when receiving a reset signal from the controller.

2. The lighting control device according to claim 1, wherein:
the controller is configured to
set the control signal in the first control state when the indicating signal indicates turning on the light source, and
set the control signal in the second control state when the indicating signal indicates turning off the light source;
the ignition signal is in the activated state while the motor of the vehicle is activated;
the ignition signal is in the rest state while the motor of the vehicle is not activated; and
the logic circuit is configured to
turn on the light source while the second signal is in the first state and the control signal is in the first control state,
turn off the light source while the second signal is in the first state and the control signal is in the second control state,
turn on the light source while the second signal is in the second state and the ignition signal is in the activated state, and
turn off the light source while the second signal is in the second state and the ignition signal is in the rest state.

3. The lighting control device according to claim 2, wherein:

the latch circuit is configured to set the second signal in the first state when receiving a reset signal; and
the controller is configured to, when determining that the controller can communicate with a sender outputting the indicating signal, output the reset signal to the latch circuit at a timing of setting the control signal in either the first control state or the second control state.

4. The lighting control device according to claim 2, wherein:
the latch circuit is configured to set the second signal in the first state when receiving a reset signal; and
the controller is configured to, when determining that the controller can communicate with a sender outputting the indicating signal, output the reset signal to the latch circuit at a timing of setting the ignition signal in either the activated state or the rest state.

5. The lighting control device according to claim 1, wherein:
the latch circuit is configured to set the second signal in the first state when receiving a reset signal; and
the controller is configured to start a process of periodically outputting the reset signal to the latch circuit when determining that the controller can communicate with a sender outputting the indicating signal.

6. The lighting control device according to claim 1, wherein:
the lighting control device is comprised by a lighting device, wherein
the lighting device further includes a warning device;
the latch circuit is configured to output an informing signal to the warning device when receiving the first signal; and
the warning device is configured to provide notice when receiving the informing signal.

7. The lighting control device according to claim 6, wherein
the warning device is installed inside of a body of the vehicle.

8. The lighting control device according to claim 1, wherein
the lighting control device is comprised by a vehicle, wherein
the light source includes a headlight installed at a front part of a body of the vehicle.

9. The lighting control device according to claim 8, wherein
the light source includes a light source for low beams.

10. The lighting control device according to claim 1, wherein:
the latch circuit is configured to turn on the switch when receiving a reset signal from the controller so as to supply electrical power to the diagnosis circuit.

* * * * *